United States Patent
Cao

(10) Patent No.: US 10,560,946 B2
(45) Date of Patent: Feb. 11, 2020

(54) D2D TRANSMISSION DISTANCE OBTAINING METHOD AND DEVICE

(71) Applicant: Huawei Technologies Co., Ltd., Shenzhen (CN)

(72) Inventor: Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 15/608,272

(22) Filed: May 30, 2017

(65) Prior Publication Data

US 2017/0273088 A1 Sep. 21, 2017

Related U.S. Application Data

(63) Continuation of application No. PCT/CN2014/092584, filed on Nov. 28, 2014.

(51) Int. Cl.
*H04W 72/04* (2009.01)
*G01S 11/06* (2006.01)
(Continued)

(52) U.S. Cl.
CPC ......... *H04W 72/0473* (2013.01); *G01S 11/06* (2013.01); *H04W 64/00* (2013.01);
(Continued)

(58) Field of Classification Search
CPC . G01S 11/06; G01S 5/02; G01S 13/74; H04L 61/6022; H04W 4/00; H04W 64/00;
(Continued)

(56) References Cited

U.S. PATENT DOCUMENTS

2005/0271057 A1* 12/2005 Kim .................. H04W 64/00
370/389
2010/0315289 A1 12/2010 Nurmela et al.
(Continued)

FOREIGN PATENT DOCUMENTS

CN 101606076 A 12/2009
CN 103630876 A 3/2014
(Continued)

OTHER PUBLICATIONS

Machine Translation and Abstract of Chinese Publication No. CN103630876, Mar. 12, 2014, 6 pages.
(Continued)

*Primary Examiner* — Kyaw Z Soe
(74) *Attorney, Agent, or Firm* — Conley Rose, P.C.

(57) ABSTRACT

A device-to-device (D2D) transmission distance obtaining method and a device, related to the field of communications technologies and applied to wireless communications, where the method includes obtaining, by a first device, transmit power information, where the transmit power information indicates a transmit power used by the first device for sending data to a second device, and sending, by the first device, the transmit power information to the second device such that the second device obtains a distance between the second device and the first device, where the distance between the second device and the first device is obtained according to the transmit power and receive power used by the second device for sending the data. Hence, a more accurate D2D distance can be obtained.

17 Claims, 8 Drawing Sheets

(51) Int. Cl.
*H04W 64/00* (2009.01)
*H04L 29/12* (2006.01)
*H04W 88/08* (2009.01)
*H04W 92/10* (2009.01)

(52) U.S. Cl.
CPC ......... *H04L 61/6022* (2013.01); *H04W 88/08* (2013.01); *H04W 92/10* (2013.01)

(58) Field of Classification Search
CPC . H04W 72/0473; H04W 88/08; H04W 92/10; H04W 92/18; H04W 52/383; H04W 88/02; H04B 17/27; H04M 1/00
See application file for complete search history.

(56) References Cited

U.S. PATENT DOCUMENTS

| | | | |
|---|---|---|---|
| 2013/0017856 A1 | 1/2013 | Murias et al. | |
| 2015/0050929 A1* | 2/2015 | Song | H04W 52/383 455/426.1 |
| 2015/0358802 A1* | 12/2015 | Nagata | H04W 8/005 370/329 |
| 2016/0135178 A1* | 5/2016 | Mok | H04W 4/023 455/450 |
| 2016/0142897 A1* | 5/2016 | Sorrentino | H04W 76/14 370/329 |
| 2017/0244501 A1* | 8/2017 | Yasukawa | G01S 11/06 |

FOREIGN PATENT DOCUMENTS

| | | |
|---|---|---|
| CN | 103797882 A | 5/2014 |
| CN | 103957031 A | 7/2014 |
| EP | 3208631 A1 | 8/2017 |
| WO | 2013054144 A1 | 4/2013 |
| WO | 2016060177 A1 | 4/2016 |

OTHER PUBLICATIONS

Machine Translation and Abstract of Chinese Publication No. CN103957031, Jul. 30, 2014, 7 pages.
"3rd Generation Partnership Project; Technical Specification Group Services and System Aspects; Proximity-based services (ProSe); Stage 2 (Release 12)," 3GPP TS 23.303, V12.2.0, Technical Specification, Sep. 2014, 61 pages.
"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.3.0, Technical Specification, Sep. 2014, 378 pages.
Foreign Communication From a Counterpart Application, PCT Application No. PCT/CN2014/092584, English Translation of International Search Report dated Jul. 28, 2015, 2 pages.
Foreign Communication From a Counterpart Application, PCT Application No. PCT/CN2014/092584, English Translation of Written Opinion dated Jul. 28, 2015, 6 pages.
Foreign Communication From a Counterpart Application, European Application No. 14907003.9, Extended European Search Report dated Oct. 9, 2017, 11 pages.
Foreign Communication From a Counterpart Application, Australian Application No. 2014412483, Australian Examination 1st Report dated Apr. 9, 2018, 5 pages.

* cited by examiner

D2D TRANSMISSION DISTANCE OBTAINING METHOD AND DEVICE

CROSS-REFERENCE TO RELATED APPLICATION

This application is a continuation of International Patent Application No. PCT/CN2014/092584 filed on Nov. 28, 2014, which is hereby incorporated by reference in its entirety.

TECHNICAL FIELD

The present disclosure relates to the field of communications technologies, and in particular, to a device-to-device (D2D) transmission distance obtaining method and a device.

BACKGROUND

A D2D communication technology is a technology in which devices directly communicate with each other. Different from that in a cellular communication technology, data of a transmit device does not need to be transmitted to a receive device using a base station, but is directly transmitted using an air interface between the transmit device and the receive device. Therefore, a forwarding delay of the base station is reduced. A typical application scenario of the D2D communication technology is a public security scenario such as communication between firemen. A typical service of the D2D communication technology is a voice service. In a D2D communication process, a device always needs to know a distance between the device and another device that communicates with the device. For example, in a public security scenario, a fireman needs to know a distance between the fireman and another fireman, and in an advertisement discovery scenario, an advertisement receiver needs to know a distance between the advertisement receiver and an advertisement publisher.

In other approaches, a D2D transmission distance obtaining method includes a receive device receives information sent by a transmit device, detects receive power of the information, and then estimates a distance from the transmit device to the receive device according to the receive power. In the foregoing D2D transmission distance obtaining method, only impact exerted on receive power by a D2D transmission distance is considered, and then a distance from a transmit device to a receive device is calculated according to the receive power without considering impact exerted on the receive power by another factor. Therefore, the D2D distance obtained using the foregoing method is inaccurate.

SUMMARY

Embodiments of the present disclosure provide a D2D transmission distance obtaining method and a device in order to obtain a more accurate D2D distance.

To achieve the foregoing objective, the following technical solutions are used in the embodiments of the present disclosure.

According to a first aspect, a first device is provided, where the first device includes a processing unit configured to obtain transmit power information, where the transmit power information indicates a transmit power used by the first device for sending data to a second device, and a sending unit configured to send the transmit power information obtained by the processing unit to the second device such that the second device obtains a distance between the second device and the first device, where the distance between the second device and the first device is obtained according to the transmit power and receive power that is used by the second device for receiving the data.

With reference to the first aspect, in a first possible implementation manner, the sending unit is further configured to send the transmit power information to the second device by adding the transmit power information to the data.

With reference to the first possible implementation manner, in a second possible implementation manner, the data is Media Access Control (MAC) layer communication data, and the transmit power information is included in a control unit of the MAC layer communication data.

With reference to the first aspect, in a third possible implementation manner, the sending unit is further configured to send the transmit power information in physical layer control information of the data.

With reference to any one of the first aspect or the possible implementation manners of the first aspect, in a fourth possible implementation manner, the first device and the second device are terminals.

According to a second aspect, a second device is provided, where the second device includes a receiving unit configured to receive transmit power information sent by the first device, where the transmit power information indicates a transmit power used by the first device for sending data to the second device, and a processing unit configured to obtain receive power information, where the receive power information indicates receive power used by the second device for receiving the data sent by the first device, and the processing unit is further configured to obtain a distance between the second device and the first device, where the distance between the second device and the first device is obtained according to the receive power and the transmit power that is received by the receiving unit.

With reference to the second aspect, in a first possible implementation manner, the processing unit calculates the distance between the second device and the first device according to the receive power and the transmit power.

With reference to the second aspect, in a second possible implementation manner, the second device further includes a sending unit, and the sending unit is configured to send the transmit power information and the receive power information to a third device, and the processing unit is configured to obtain the distance between the second device and the first device that is sent by the third device and received by the receiving unit.

With reference to the second aspect, the first possible implementation manner, or the second possible implementation manner, in a third possible implementation manner, the receiving unit is further configured to receive the transmit power information carried in the data.

With reference to the third possible implementation manner, in a fourth possible implementation manner, the data is MAC layer communication data, and the transmit power information is included in a control unit of the MAC layer communication data.

With reference to the second aspect, the first possible implementation manner, or the second possible implementation manner, in a fifth possible implementation manner, the receiving unit is further configured to obtain the transmit power information from physical layer control information of the data sent by the first device.

With reference to any one of the second aspect or the possible implementation manners of the second aspect, in a sixth possible implementation manner, the first device and the second device are terminals.

According to a third aspect, a third device is provided, where the third device includes a receiving unit configured to receive transmit power information and receive power information that are sent by the second device, where the transmit power information indicates transmit power used by a first device for sending data to the second device, and the receive power information indicates receive power used by the second device for receiving the data sent by the first device, a processing unit configured to calculate a distance between the second device and the first device according to the transmit power and the receive power that are received by the receiving unit, and a sending unit configured to send, to the second device, the distance between the second device and the first device that is calculated by the processing unit.

With reference to the third aspect, in a first possible implementation manner, the first device and the second device are terminals, and the third device is a base station or a core network element.

With reference to the third aspect, in a second possible implementation manner, the core network element is a proximity-based service function (ProSe Function) entity.

According to a fourth aspect, a D2D transmission distance obtaining method is provided, including obtaining, by a first device, transmit power information, where the transmit power information indicates transmit power used by the first device for sending data to a second device, and sending, by the first device, the transmit power information to the second device such that the second device obtains a distance between the second device and the first device, where the distance between the second device and the first device is obtained according to the transmit power and receive power that is used by the second device for receiving the data.

With reference to the fourth aspect, in a first possible implementation manner, sending, by the first device, the transmit power information to the second device includes sending, by the first device, the transmit power information to the second device by adding the transmit power information to the data.

With reference to the first possible implementation manner, in a second possible implementation manner, the data is MAC layer communication data, and the transmit power information is included in a control unit of the MAC layer communication data.

With reference to the fourth aspect, in a third possible implementation manner, sending, by the first device, the transmit power information to the second device includes sending, by the first device, the transmit power information in physical layer control information of the data.

With reference to any one of the fourth aspect or the possible implementation manners of the fourth aspect, in a fourth possible implementation manner, the first device and the second device are terminals.

According to a fifth aspect, a D2D transmission distance obtaining method is provided, including receiving, by a second device, transmit power information sent by the first device, where the transmit power information indicates transmit power used by the first device for sending data to the second device, obtaining, by the second device, receive power information, where the receive power information indicates receive power used by the second device for receiving the data sent by the first device, and obtaining, by the second device, a distance between the second device and the first device, where the distance between the second device and the first device is obtained according to the receive power and the transmit power.

With reference to the fifth aspect, in a first possible implementation manner, obtaining, by the second device, a distance between the second device and the first device includes calculating, by the second device, the distance between the second device and the first device according to the receive power and the transmit power.

With reference to the fifth aspect, in a second possible implementation manner, the method further includes sending, by the second device, the transmit power information and the receive power information to a third device, and obtaining, by the second device, a distance between the second device and the first device includes receiving, by the second device, the distance between the second device and the first device that is sent by the third device.

With reference to the fifth aspect, the first possible implementation manner, or the second possible implementation manner, in a third possible implementation manner, receiving, by a second device, transmit power information sent by the first device includes receiving, by the second device, the transmit power information carried in the data.

With reference to the third possible implementation manner, in a fourth possible implementation manner, the data is MAC layer communication data, and the transmit power information is included in a control unit of the MAC layer communication data.

With reference to the fifth aspect, the first possible implementation manner, or the second possible implementation manner, in a fifth possible implementation manner, receiving, by a second device, transmit power information sent by the first device includes obtaining, by the second device, the transmit power information from physical layer control information of the data sent by the first device.

With reference to any one of the fifth aspect or the possible implementation manners of the fifth aspect, in a sixth possible implementation manner, the first device and the second device are terminals.

According to a sixth aspect, a D2D transmission distance obtaining method is provided, including receiving, by a third device, transmit power information and receive power information that are sent by the second device, where the transmit power information indicates transmit power used by a first device for sending data to the second device, and the receive power information indicates receive power used by the second device for receiving the data sent by the first device, calculating, by the third device, a distance between the second device and the first device according to the transmit power and the receive power, and sending, by the third device, the distance between the second device and the first device to the second device.

With reference to the sixth aspect, in a first possible implementation manner, the first device and the second device are terminals, and the third device is a base station or a core network element.

With reference to the first possible implementation manner, in a second possible implementation manner, the core network element is a ProSe Function entity.

According to the D2D transmission distance obtaining method and the device that are provided in the embodiments of the present disclosure, a first device first obtains transmit power information, and then sends the transmit power information to the second device, the second device receives the transmit power information that indicates transmit power, and obtains receive power information used to indicate receive power when data sent by the first device is received, and finally, the second device obtains a distance between the second device and the first device that is obtained according to the receive power and the transmit power. Compared with the other approaches in which a distance between devices is estimated only according to receive power, in the embodiments of the present disclosure, impact exerted on the receive power by the transmit power of the first device is further considered. Therefore, in the embodiments of the present disclosure, the second device can obtain a more accurate distance between the second device and the first device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The first device and the second device provided in the embodiments of the present disclosure are usually terminals, for example, may be a cellular phone, a cordless phone, a Session Initiation Protocol (SIP) phone, a wireless local loop (WLL) station, a personal digital assistant (PDA), a handheld device with a wireless communication function, an in-vehicle device, a wearable device, a computing device, or another processing device connected to a wireless modem.

The third device in the embodiments of the present disclosure may be a base station or another access device, for example, may refer to a device that communicates with a wireless terminal using one or more sectors on an air interface in an access network. The base station may be configured to mutually convert a received over-the-air frame and an Internet Protocol (IP) packet, and is used as a router between the wireless terminal and a remaining part of the access network. The remaining part of the access network may include an IP protocol network. The base station may further coordinate attribute management of the air interface. For example, the base station may be a base transceiver station (BTS) in Global system for mobile communications (GSM) or Code Division Multiple Access (CDMA), may be a NodeB in Wideband Code Division Multiple Access (WCDMA), or may be an evolved NodeB (eNB or e-NodeB) in Long Term Evolution (LTE). This is not limited in the embodiments of the present disclosure.

Figure 1:
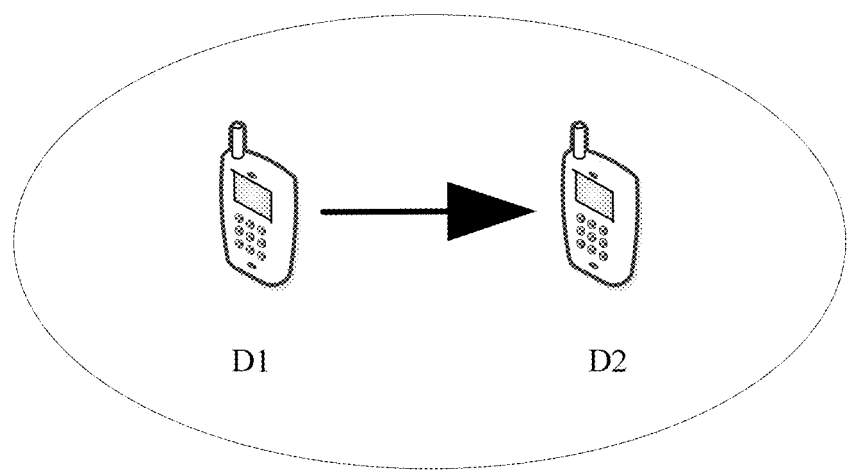
FIG. 1 is a schematic structural diagram of a wireless communications system according to an embodiment of the present disclosure.

As shown in FIG. 1, the embodiments of the present disclosure are applied to a wireless communications system that includes at least one first device D1 and at least one second device D2, and the first device D1 may communicate with the second device D2 in a D2D manner. Optionally, the first device D1 and the second device D2 are terminals. In description in the following embodiments, the first device D1 is used as a terminal that transmits data, and the second device D2 is used as a terminal that receives data.

Figure 2:
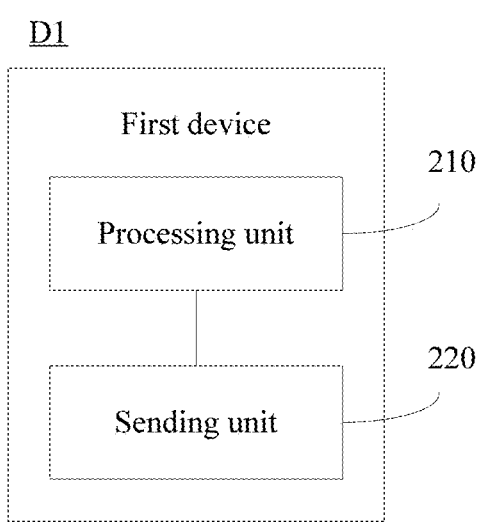
FIG. 2 is a schematic structural diagram of a first device according to an embodiment of the present disclosure.

An embodiment of the present disclosure provides a first device D1, and D1 may be D1 in a wireless communications system shown in FIG. 1. As shown in FIG. 2, the first device D1 includes a processing unit 210 and a sending unit 220. The processing unit 210 may be a processor and the sending unit 220 may be a transmitter.

The processing unit 210 is configured to obtain transmit power information, and the transmit power information indicates a transmit power used by the first device D1 for sending data to a second device D2.

The sending unit 220 is configured to send the transmit power information obtained by the processing unit 210 to the second device D2 such that the second device D2 obtains a distance between the second device D2 and the first device D1. The distance between the second device D2 and the first device D1 is obtained according to the transmit power and receive power that is used by the second device D2 for receiving the data.

In the foregoing embodiment, a processing unit 210 of a first device D1 first obtains transmit power information. Then, a sending unit 220 sends the transmit power information obtained by the processing unit 210 to the second device D2 such that the second device D2 obtains a distance between the second device D2 and the first device D1. Compared with the other approaches in which a distance between devices is estimated only according to receive power, in this embodiment of the present disclosure, impact exerted on receive power by transmit power of the first device is further considered. Therefore, in this embodiment of the present disclosure, the second device D2 can obtain a more accurate distance between the second device D2 and the first device D1.

Optionally, the sending unit 220 is further configured to send the transmit power information to the second device D2 by adding the transmit data information to the data. Further optionally, the data is MAC layer communication data, and the transmit power information is included in a control unit of the MAC layer communication data. For example, the sending unit 220 may configure the transmit power information in a header of a data packet of the communication data, and then send the communication data to the second device D2. For another example, the sending unit 220 may configure the transmit power information in a dedicated control unit of a data packet of the communication data, and then send the communication data to the second device D2.

Optionally, the sending unit 220 is further configured to send the transmit power information in physical layer control information of the data. Further, the sending unit 220 sends the transmit power information to the second device D2 on a physical layer channel or in dedicated control signaling, for example, sends the transmit power information on a physical layer synchronization channel or another control channel.

The transmit power may be represented as a power value used in data transmission, such as 20 decibel-milliwatts (dBm), or may be certainly a power value of other dBm or decibel-volts. Alternatively, the transmit power may be represented as a destination distance for which the data is transmitted, such as 100 meters (m) or a distance threshold range that represents a long, middle, or short distance.

Figure 3:
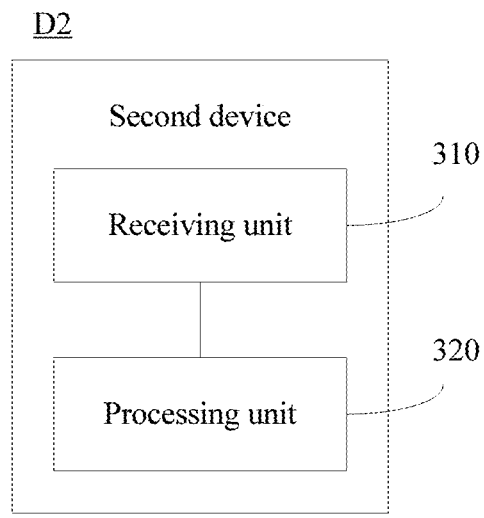
FIG. 3 is a schematic structural diagram of a second device according to an embodiment of the present disclosure.

An embodiment of the present disclosure provides a second device D2, and the second device D2 may be D2 in a wireless communications system shown in FIG. 1. As shown in FIG. 3, the second device D2 includes a receiving unit 310 and a processing unit 320. The processing unit 320 may be a processor and the receiving unit 310 may be a receiver.

The receiving unit 310 is configured to receive transmit power information sent by the first device D1, and the transmit power information indicates a transmit power used by the first device D1 for sending data to the second device D2.

The processing unit 320 is configured to obtain receive power information, and the receive power information indicates a receive power used by the second device D2 for receiving the data sent by the first device D1.

The processing unit 320 is further configured to obtain a distance between the second device D2 and the first device D1, and the distance between the second device D2 and the first device D1 is obtained according to the receive power and the transmit power that is received by the receiving unit 310.

In the foregoing embodiment, a receiving unit 310 of a second device D2 first receives transmit power information sent by a first device D1. Then, a processing unit 320 obtains a distance between the second device D2 and the first device D1 according to the receive power and the transmit power that is received by the receiving unit 310. Compared with the other approaches in which a distance between devices is estimated only according to receive power, in this embodiment of the present disclosure, impact exerted on the receive power by the transmit power of the first device D1 is further considered. Therefore, in this embodiment of the present disclosure, the second device D2 can obtain a more accurate distance between the second device D2 and the first device D1.

Optionally, the receiving unit 310 is further configured to receive the transmit power information carried in the data. Further, the data is MAC layer communication data, and the transmit power information is included in a control unit of the MAC layer communication data. For example, the transmit power information may be carried in a header of a data packet of the data. For another example, the transmit power information is carried in a dedicated control unit of a data packet of the data.

Optionally, the receiving unit 310 is further configured to obtain the transmit power information from physical layer control information of the data sent by the first device D1. Further, the receiving unit 310 obtains the transmit power information from a physical layer channel or dedicated control signaling, for example, obtains the transmit power information from a physical layer synchronization channel or another control channel.

The transmit power may be represented as a power value used in data transmission, such as 20 dBm, or may be certainly a power value of other dBm or decibel-volts. Alternatively, the transmit power may be represented as a destination distance for which the data is transmitted, such as 100 m or a distance threshold range that represents a long, middle, or short distance.

Further optionally, the processing unit 320 calculates the distance between the second device D2 and the first device D1 according to the receive power and the transmit power. Further, a power difference may be obtained by subtracting the receive power from the transmit power, and then, the distance between the second device D2 and the first device D1 may be obtained by dividing the power difference by a power loss per unit of distance. Alternatively, the processing unit 320 calculates the distance between the second device D2 and the first device D1 according to the receive power and the transmit power and using a preset formula.

Figure 4:
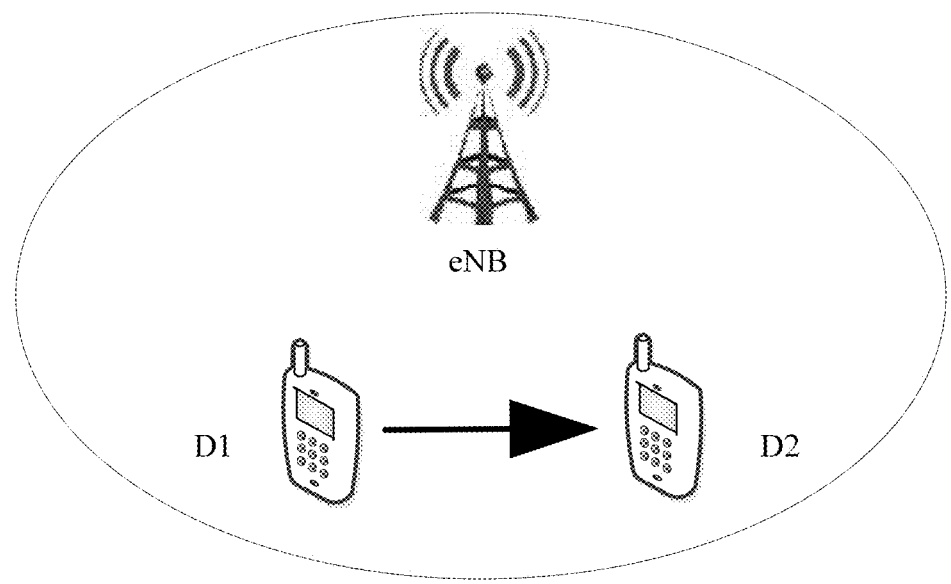
FIG. 4 is a schematic structural diagram of a wireless communications system according to another embodiment of the present disclosure.

As shown in FIG. 4, the embodiments of the present disclosure are applied to a wireless communications system that includes at least one first device D1, at least one second device D2, and at least one third device D3 (D3 is shown by an eNB in FIG. 4). Optionally, the first device D1 and the second device D2 are terminals, and the third device D3 is a base station or a core network element. Further, the core network element is a ProSe Function entity. The first device D1 may communicate with the second device D2 in a D2D manner. In description in the following embodiments, the first device D1 is used as a terminal that transmits data, the second device D2 is used as a terminal that receives data, and the third device D3 is an eNB that can communicate with the first device D1 and the second device D2.

A function of the first device D1 in the wireless communications system shown in FIG. 4 is the same as that of the first device D1 in the wireless communications system shown in FIG. 1 in the foregoing embodiment. To avoid repetition, details of the first device D1 are not described again.

Figure 5:
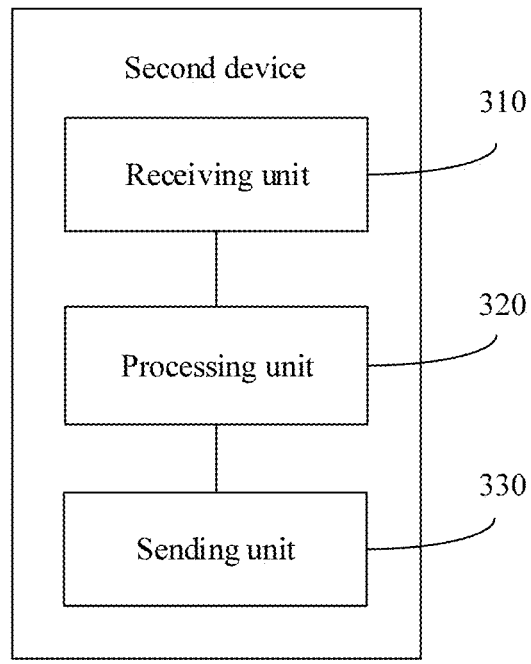
FIG. 5 is a schematic structural diagram of a second device according to another embodiment of the present disclosure.

An embodiment of the present disclosure provides a second device D2, and the second device D2 may be D2 in a wireless communications system shown in FIG. 4. As shown in FIG. 5, the second device D2 includes a receiving unit 310 and a processing unit 320. The processing unit 320 may be a processor and the receiving unit 310 may be a receiver.

The receiving unit 310 is configured to receive transmit power information sent by the first device D1, and the transmit power information indicates transmit power used by the first device D1 for sending data to the second device D2.

The processing unit 320 is configured to obtain receive power information, and the receive power information indicates a receive power used by the second device for receiving the data sent by the first device.

The processing unit 320 is further configured to obtain a distance between the second device D2 and the first device D1, and the distance between the second device D2 and the first device D1 is obtained according to the receive power and the transmit power that is received by the receiving unit 310.

Optionally, as shown in FIG. 5, the second device D2 further includes a sending unit 330. The sending unit 330 may be a transmitter, and the sending unit 330 is configured to send the transmit power information and the receive power information to a third device D3.

The processing unit 320 is configured to obtain the distance between the second device D2 and the first device D1 that is sent by the third device D3 and received by the receiving unit 310.

Figure 6:
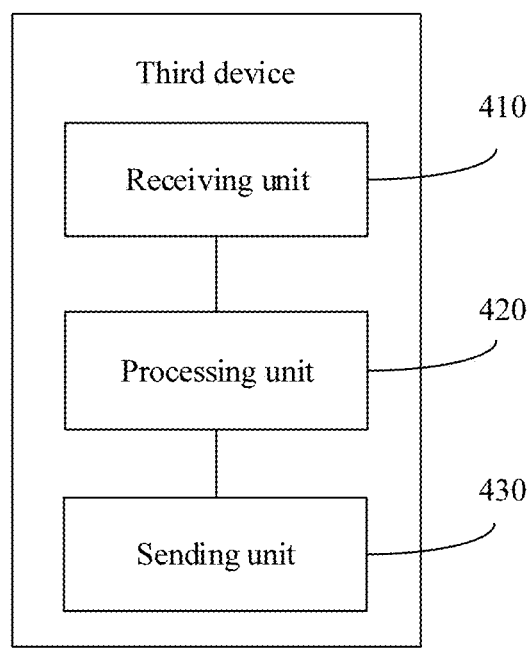
FIG. 6 is a schematic structural diagram of a third device according to an embodiment of the present disclosure.

An embodiment of the present disclosure provides a third device D3. As shown in FIG. 6, the third device D3 includes a receiving unit 410, a processing unit 420, and a sending unit 430. The receiving unit 410 may be a receiver, the processing unit 420 may be a processor, and the sending unit 430 may be a transmitter.

The receiving unit 410 is configured to receive transmit power information and receive power information that are sent by the second device D2, and the transmit power information indicates transmit power used by a first device D1 for sending data to the second device D2, and the receive power information indicates a receive power used by the second device D2 for sending the data sent by the first device D1.

The processing unit 420 is configured to calculate a distance between the second device D2 and the first device D1 according to the transmit power and the receive power that are received by the receiving unit 410.

The sending unit 430 is configured to send, to the second device D2, the distance between the second device D2 and the first device D1 that is calculated by the processing unit 420.

Optionally, the first device D1 and the second device D2 are terminals, and the third device D3 is a base station or a core network element. Further, the core network element is a ProSe Function entity.

In the foregoing embodiment, a third device D3 receives transmit power information and receive power information that are sent by the second device D2, then obtains a distance between the second device D2 and the first device D1 according to received receive power and received transmit power, and sends the distance between the second device D2 and the first device D1 to the second device D2. Compared with the other approaches in which a distance between devices is estimated only according to receive power, in this embodiment of the present disclosure, impact exerted on the receive power by the transmit power of the first device D1 is further considered. Therefore, in this embodiment of the present disclosure, the second device D2 can obtain a more accurate distance between the second device D2 and the first device D1.

Embodiments of the present disclosure are applied to a wireless communications system (for example, a wireless communications system shown in FIG. 1) that includes at least one first device D1 and at least one second device D2, and the first device D1 may communicate with the second device D2 in a D2D manner. In description of the following embodiments, the first device D1 is used as a terminal that transmits data, and the second device D2 is used as a terminal that receives data.

Figure 7:
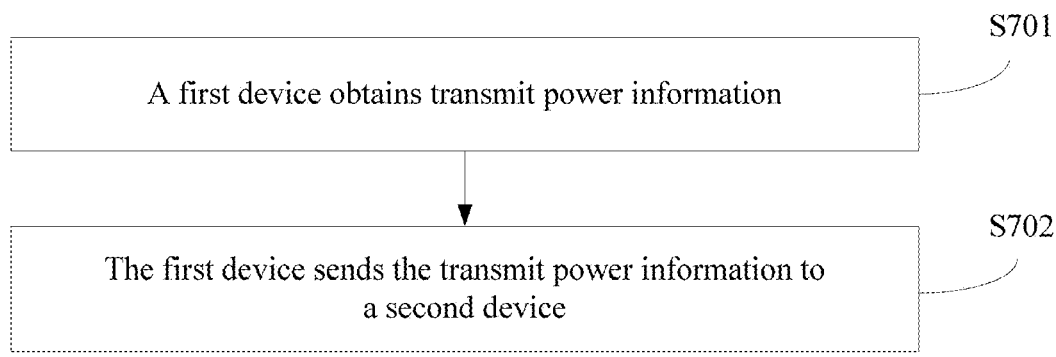
FIG. 7 is a flowchart of a D2D transmission distance obtaining method according to an embodiment of the present disclosure.

Further, an embodiment of the present disclosure provides a D2D transmission distance obtaining method. As shown in FIG. 7, a first device D1 is configured to perform the following steps.

Step S701: The first device obtains transmit power information, where the transmit power information indicates a transmit power used by the first device for sending data to a second device.

Step S702: The first device sends the transmit power information to the second device such that the second device obtains a distance between the second device and the first device, where the distance between the second device and the first device is obtained according to the transmit power and receive power that is used by the second device for receiving the data.

Figure 8:
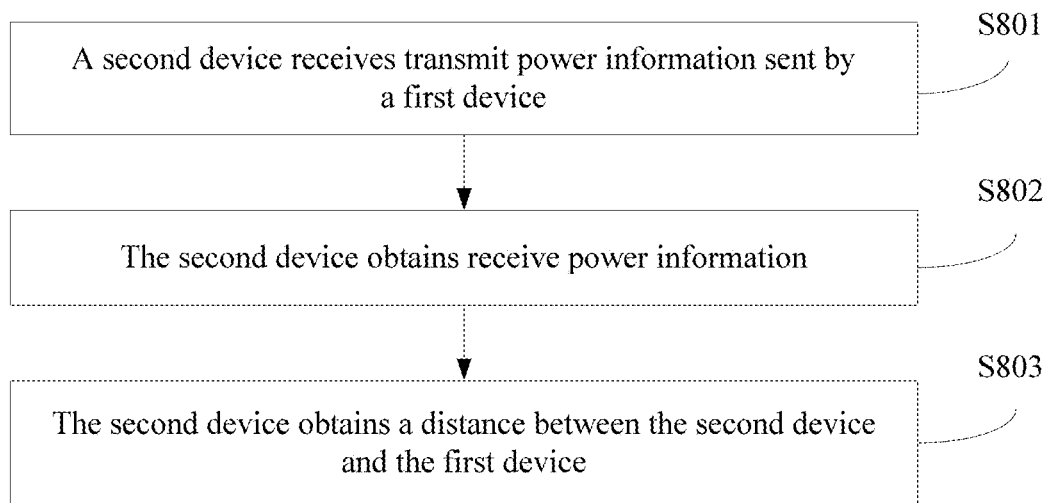
FIG. 8 is a flowchart of a D2D transmission distance obtaining method according to another embodiment of the present disclosure.

An embodiment of the present disclosure provides a D2D transmission distance obtaining method. As shown in FIG. 8, a second device D2 is configured to perform the following steps.

Step S801: The second device receives transmit power information sent by the first device, where the transmit power information indicates transmit power used by the first device for sending data to the second device.

Step S802: The second device obtains receive power information, where the receive power information indicates receive power used by the second device for receiving the data sent by the first device.

Step S803: The second device obtains a distance between the second device and the first device, where the distance between the second device and the first device is obtained according to the receive power and the transmit power.

In the foregoing embodiment, a first device first obtains transmit power information, and then sends the transmit power information to the second device. The second device receives the transmit power information that indicates transmit power, and obtains receive power information used to indicate receive power when data sent by the first device is received. Finally, the second device obtains a distance between the second device and the first device that is obtained according to the receive power and the transmit power. Compared with the other approaches in which a distance between devices is estimated only according to receive power, in this embodiment of the present disclosure, impact exerted on the receive power by the transmit power of the first device is further considered. Therefore, in this embodiment of the present disclosure, the second device can obtain a more accurate distance between the second device and the first device.

Figure 9:
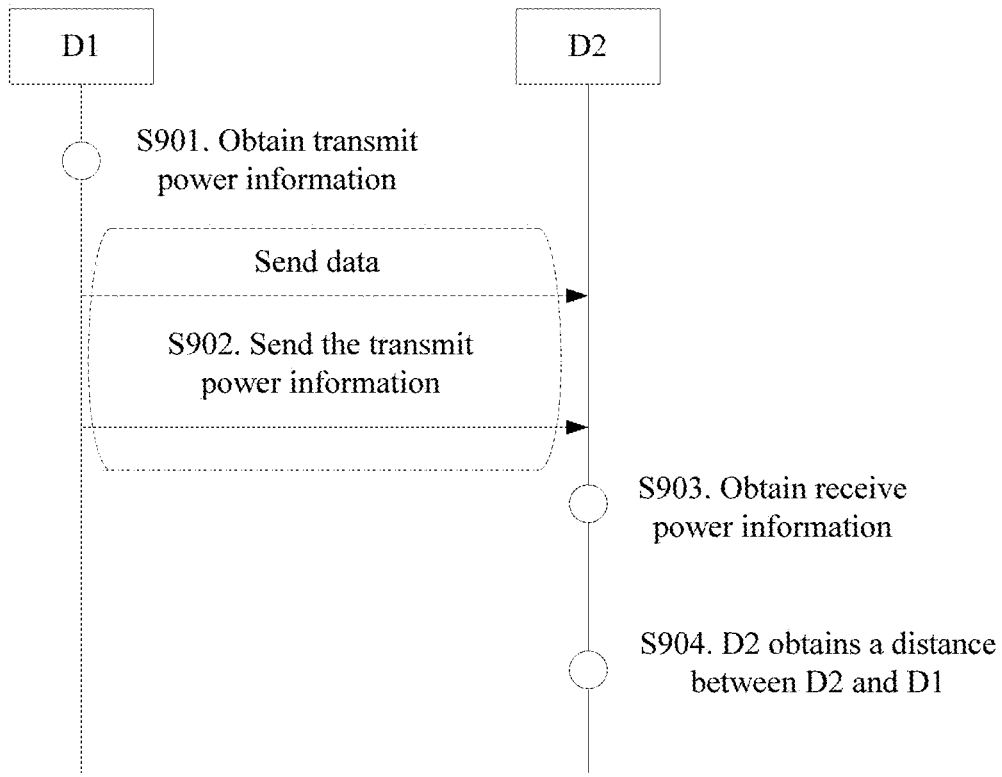
FIG. 9 is a flowchart of a D2D transmission distance obtaining method according to still another embodiment of the present disclosure.

Further, an embodiment of the present disclosure provides a D2D transmission distance obtaining method. As shown in FIG. 9, the following steps are included.

Step S901: D1 obtains transmit power information, where the transmit power information indicates a transmit power used by D1 for sending data to D2.

Step S902: D1 sends the transmit power information to D2.

Optionally, step S902 includes that D1 sends the transmit power information to D2 by adding the transmit power information to the data. Further and optionally, the data is MAC layer communication data. The transmit power information is included in a control unit of the MAC layer communication data, or the transmit power information is included in a header of the MAC layer communication data. For example, D1 may configure the transmit power information in a header of a data packet of the communication data, and then send the communication data to D2. For another example, D1 may configure the transmit power information in a dedicated control unit of a data packet of the communication data, and then send the communication data to D2. Correspondingly, that D2 receives the transmit power information sent by D1 includes that D2 receives the transmit power information carried in the data, and is as follows. D2 receives the data sent by D1, and D2 obtains the transmit power information from the data. For example, when the data is Media Access Control layer communication data, D2 obtains the transmit power information from the control unit of the Media Access Control layer communication data.

Optionally, in step S902, D1 sends the transmit power information in physical layer control information of the data. D1 may send the transmit power information to D2 on a physical layer channel or in dedicated control signaling, for example, send the transmit power information on a physical layer synchronization channel or another control channel. In this case, before or after step S902, D1 starts to send the data to D2. Correspondingly, that D2 receives the transmit power information sent by D1 includes that D2 obtains the transmit power information from the physical layer control information of the data sent by D1.

The transmit power may be represented as a power value used in data transmission, such as 20 dBm, or may be certainly a power value of other dBm or decibel-volts. Alternatively, the transmit power may be represented as a destination distance for which the data is transmitted, such as 100 m or a distance threshold range that represents a long, middle, or short distance.

Step S903: D2 obtains receive power information, where the receive power information indicates a receive power used by D2 for receiving the data sent by D1.

In step S903, a method for obtaining the receive power information by D2 includes D2 receives the data sent by D1, and detects receive power of the data while receiving the data in order to obtain the receive power.

Step S904: D2 obtains a distance between D2 and D1, where the distance between D2 and D1 is obtained according to the receive power and the transmit power.

Optionally, in step S904, that D2 obtains a distance between D2 and D1 may include that the distance between the second device D2 and the first device D1 is calculated according to the receive power and the transmit power. Further, a power difference may be obtained by subtracting the receive power from the transmit power, and then, the distance between D2 and D1 may be obtained by dividing the power difference by a power loss per unit of distance. Alternatively, the distance between D2 and D1 is obtained according to the receive power and the transmit power and using a preset formula.

In the foregoing embodiment, a D1 first obtains transmit power information, and then sends the transmit power information to the D2. The D2 receives the transmit power information that indicates transmit power, and obtains receive power information used to indicate receive power when data sent by the D1 is received. Finally, the D2 obtains a distance between the D2 and the D1 that is obtained according to the receive power and the transmit power. Compared with the other approaches in which a distance between devices is estimated only according to receive power, in this embodiment of the present disclosure, impact exerted on the receive power by the transmit power of the D1 is further considered. Therefore, in this embodiment of the present disclosure, the D2 can obtain a more accurate distance between the D2 and the D1.

Embodiments of the present invention are applied to a wireless communications system that includes at least one first device D1, at least one second device D2, and at least one third device D3 (for example, an eNB shown in FIG. 5). Optionally, the first device and the second device are terminals, and the third device is a base station or a core network element. The core network element is a proximity-based service function entity (ProSe Function). The first device D1 may communicate with the second device D2 in a D2D manner. In description in the following embodiments, the first device D1 is used as a terminal that transmits data, the second device D2 is used as a terminal that receives data, and the third device D3 is an evolved NodeB eNB that can communicate with the first device D1 and the second device D2.

Specifically, a function of the first device D1 is the same as that in the foregoing embodiment. Still as shown in FIG. 7, the first device D1 is configured to perform the following steps.

Step S701. The first device obtains transmit power information, where the transmit power information is used to indicate transmit power used by the first device for sending data to a second device.

Step S702. The first device sends the transmit power information to the second device, so that the second device obtains a distance between the second device and the first device, where the distance between the second device and the first device is obtained according to the transmit power and receive power that is used by the second device for receiving the data.

Figure 10:
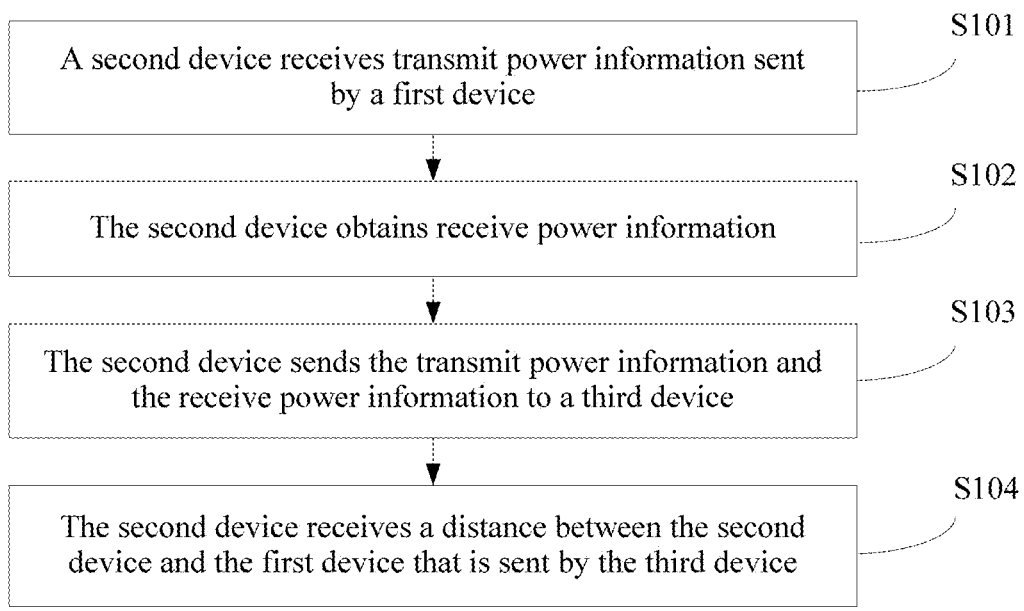
FIG. 10 is a flowchart of a D2D transmission distance obtaining method according to yet another embodiment of the present disclosure.

As shown in FIG. 10, a second device D2 is configured to perform the following steps.

Step S101: The second device receives transmit power information sent by the first device, where the transmit power information indicates a transmit power used by the first device for sending data to the second device.

Step S102: The second device obtains receive power information, where the receive power information indicates a receive power used by the second device for receiving the data sent by the first device.

Step S103: The second device sends the transmit power information and the receive power information to a third device.

Step S104: The second device receives a distance between the second device and the first device that is sent by the third device.

Figure 11:
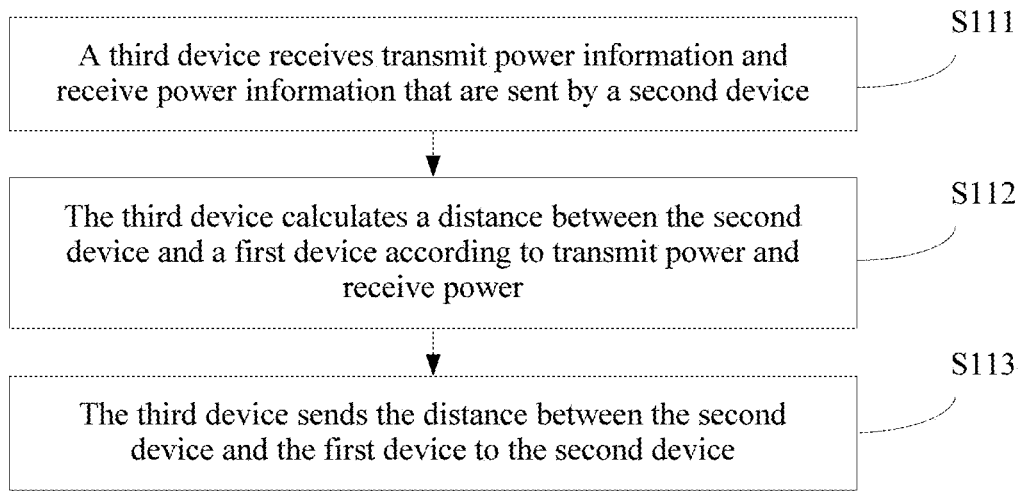
FIG. 11 is a flowchart of a D2D transmission distance obtaining method according to still yet another embodiment of the present disclosure.

As shown in FIG. 11, a third device D3 is configured to perform the following steps.

Step S111: The third device receives transmit power information and receive power information that are sent by the second device, where the transmit power information indicates transmit power used by a first device for sending data to the second device, and the receive power information indicates receive power used by the second device for receiving the data sent by the first device.

Step S112: The third device calculates a distance between the second device and the first device according to the transmit power and the receive power.

Step S113: The third device sends the distance between the second device and the first device to the second device.

In the foregoing embodiment, a first device first obtains transmit power information, and sends the transmit power information to a second device. The second device receives the transmit power information that indicates transmit power, and obtains receive power information used to indicate receive power when data sent by the first device is received. Then, the second device sends the receive power information and the transmit power information to a third device. The third device obtains a distance between the second device and the first device according to the receive power corresponding to the receive power information and the transmit power corresponding to the transmit power information, and sends the distance between the second device and the first device to the second device. Compared with the other approaches in which a distance between devices is estimated only according to receive power, in this embodiment of the present disclosure, impact exerted on the receive power by the transmit power of the first device is further considered. Therefore, in this embodiment of the present disclosure, the second device can obtain a more accurate distance between the second device and the first device. In addition, in the foregoing embodiment, the second device directly receives the distance between the second device and the first device that is sent by the third device, and does not need to obtain, through calculation, the distance between the second device and the first device according to the receive power and the transmit power such that a power loss of the second device can be reduced.

Figure 12:
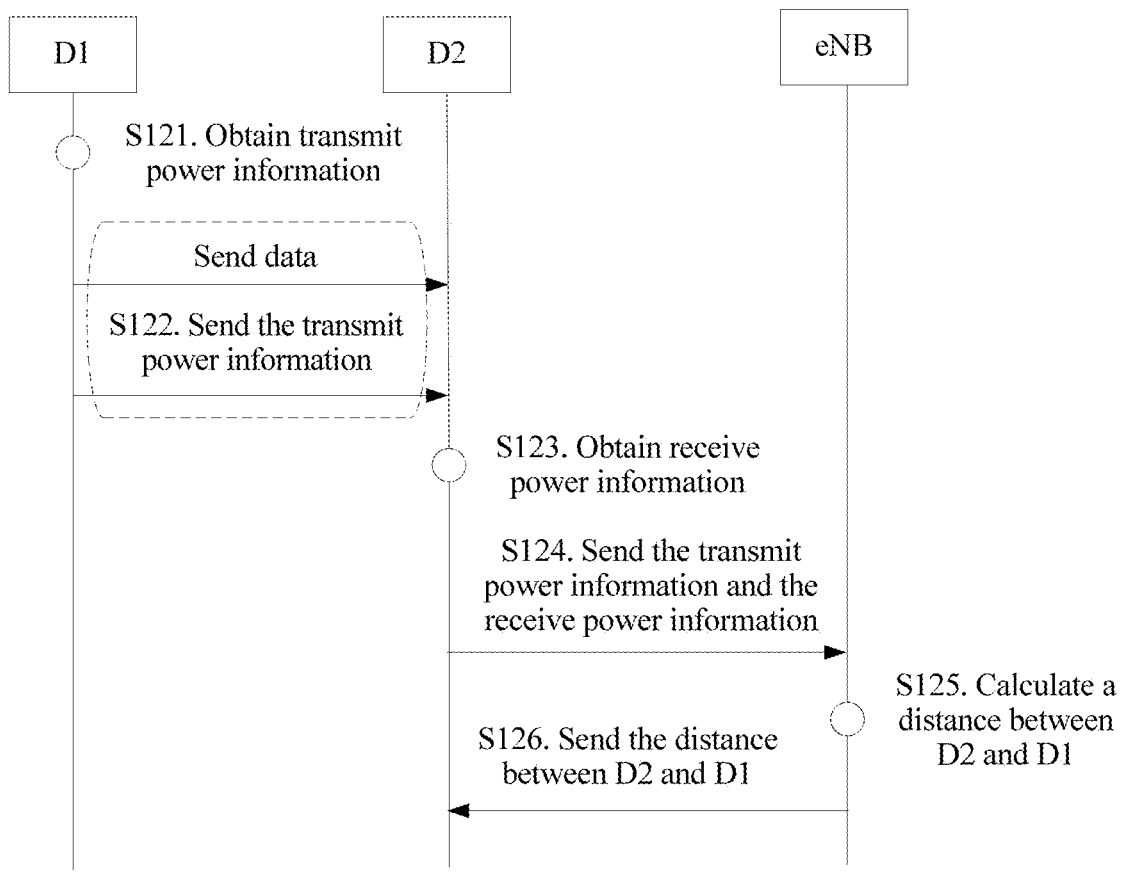
FIG. 12 is a flowchart of a D2D transmission distance obtaining method according to a further embodiment of the present disclosure.

Further, an embodiment of the present disclosure provides a D2D transmission distance obtaining method. As shown in FIG. 12, the method includes the following steps.

Step S121: D1 obtains transmit power information, where the transmit power information indicates a transmit power used by D1 for sending data to D2.

Step S122: D1 sends the transmit power information to D2.

Optionally, step S122 includes that D1 sends the transmit power information to D2 by adding the transmit power information to the data. Further and optionally, the data is MAC layer communication data. The transmit power information is included in a control unit of the MAC layer communication data, or the transmit power information is included in a header of the MAC layer communication data. For example, D1 may configure the transmit power information in a header of a data packet of the communication data, and then send the communication data to D2. For another example, D1 may configure the transmit power information in a dedicated control unit of a data packet of the communication data, and then send the communication data to D2. Correspondingly, that D2 receives the transmit power information sent by D1 includes D2 receives the transmit power information carried in the data, and is as follows. D2 receives the data sent by D1, and D2 obtains the transmit power information from the data. For example, when the data is MAC layer communication data, D2 obtains the transmit power information from the control unit of the MAC layer communication data.

Optionally, in step S122, D1 sends the transmit power information in physical layer control information of the data. D1 may send the transmit power information to D2 on a physical layer channel or in dedicated control signaling, for example, send the transmit power information on a physical layer synchronization channel or another control channel. In this case, before or after step S122, D1 starts to send the data to D2. Correspondingly, that D2 receives the transmit power information sent by D1 includes D2 obtains the transmit power information from the physical layer control information of the data sent by D1.

The transmit power may be represented as a power value used in data transmission, such as 20 dBm, or may be certainly a power value of other dBm or decibel-volts. Alternatively, the transmit power may be represented as a destination distance for which the data is transmitted, such as 100 m or a distance threshold range that represents a long, middle, or short distance.

Step S123: D2 obtains receive power information, where the receive power information indicates a receive power used by D2 for receiving the data sent by D1.

In step S123, a method for obtaining the receive power information by D2 includes that D2 receives the data sent by D1, and detects receive power of the data while receiving the data in order to obtain the receive power.

Step S124: D2 sends the transmit power information and the receive power information to an eNB.

The transmit power information indicates the transmit power used by D1 for sending data to D2, and the receive power information indicates the receive power used by D2 for receiving the data sent by D1.

Step S125: The eNB calculates a distance between D2 and D1 according to the transmit power and the receive power.

Further, a calculation manner in step S125 includes that a power difference is obtained by subtracting the receive power from the transmit power, and then, the distance between D2 and D1 may be obtained by dividing the power difference by a power loss per unit of distance. Alternatively, the distance between D2 and D1 is obtained according to the receive power and the transmit power and using a preset formula.

Step S126: The eNB sends the distance between D2 and D1 to D2.

In the foregoing embodiment, a D1 first obtains transmit power information, and sends the transmit power information to a D2. The D2 receives the transmit power information that indicates transmit power, and obtains receive power information used to indicate receive power when data sent by the D1 is received. Then, the D2 sends the receive power information and the transmit power information to an eNB. The eNB obtains a distance between the D2 and the D1 according to the receive power corresponding to the receive power information and the transmit power corresponding to the transmit power information, and sends the distance between the D2 and the D1 to the D2. Compared with the other approaches in which a distance between devices is estimated only according to receive power, in this embodiment of the present disclosure, impact exerted on the receive power by the transmit power of the D1 is further considered. Therefore, in this embodiment of the present disclosure, the D2 can obtain a more accurate distance between the D2 and the D1. In addition, in the foregoing embodiment, the D2 directly receives the distance between the D2 and the D1 that is sent by the eNB, and does not need to obtain, through calculation, the distance between the D2 and the D1 according to the receive power and the transmit power such that a power loss of the D2 can be reduced.

Figure 13:
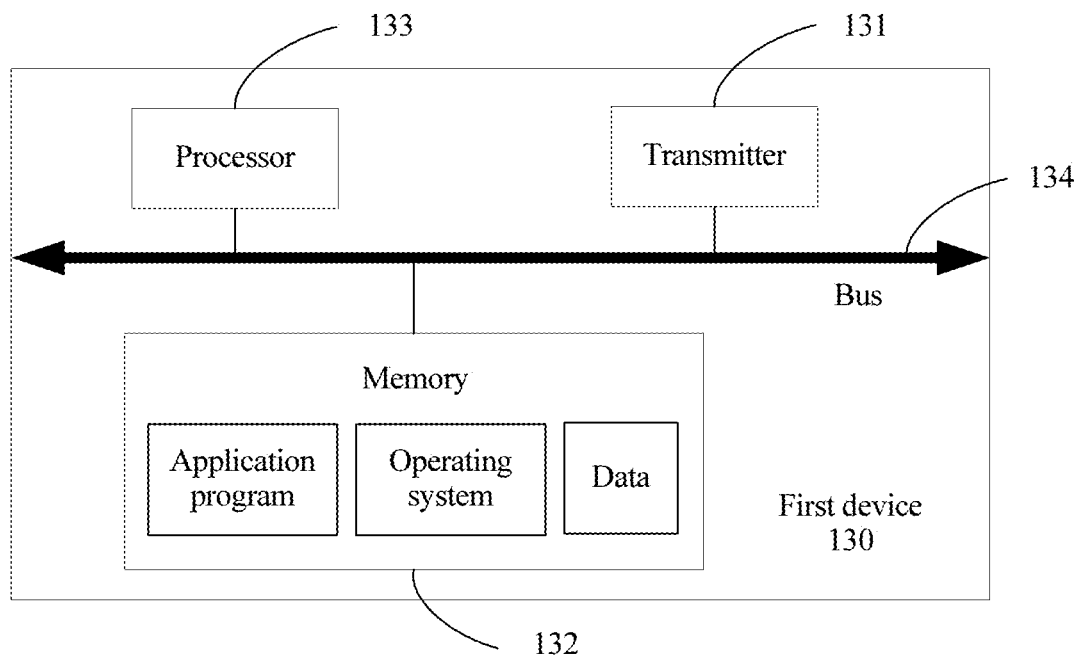
FIG. 13 is a schematic structural diagram of a first device according to another embodiment of the present disclosure.

An embodiment of the present disclosure provides a first device that is configured to implement the foregoing D2D transmission distance obtaining method. As shown in FIG. 13, the first device 130 includes a transmitter 131, a memory 132, a processor 133, and a bus 134. The transmitter 131, the memory 132, and the processor 133 are connected using the bus 134 to implement mutual communication. The memory 132 is configured to store data processed by the processor 133.

The bus 134 may be an industry standard architecture (ISA) bus, a peripheral component interconnect (PCI) bus, an extended ISA (EISA) bus, or the like. This is not limited herein. The bus 134 may be classified into an address bus, a data bus, a control bus, and the like. For convenience of denotation, the bus is represented using only one thick line in FIG. 13. However, it does not indicate that there is only one bus or only one type of bus.

The memory 132 is configured to store data or executable program code. The program code includes a computer operation instruction, and may include an operating system, an application program, or the like. The memory 132 may include a high-speed random access memory (RAM), or may further include a non-volatile memory, for example, at least one magnetic disk storage.

The processor 133 may be a central processing unit (CPU), or an application-specific integrated circuit (ASIC), or one or more integrated circuits configured for implementing this embodiment of the present disclosure.

The processor 133 is configured to implement, by executing the program code in the memory 132, a method performed by a processing unit in the embodiment of the foregoing first device, and the transmitter 131 is configured to perform a method performed by a sending unit in the embodiment of the foregoing first device.

The processor 133 is configured to obtain transmit power information, and the transmit power information indicates a transmit power used by the first device 130 for sending data to a second device.

The transmitter 131 is configured to send the transmit power information obtained by the processor 133 to the second device such that the second device obtains a distance between the second device and the first device 130. The distance between the second device and the first device 130 is obtained according to the transmit power and receive power that is used by the second device for receiving the data.

Optionally, the transmitter 131 is further configured to send the transmit power information to the second device by adding the transmit power information to the data.

Further optionally, the data is MAC layer communication data, and the transmit power information is included in a control unit of the MAC layer communication data.

Optionally, the transmitter 131 is further configured to send the transmit power information in physical layer control information of the data.

Optionally, the first device 130 and the second device are terminals.

In the foregoing embodiment, a processor 133 of a first device 130 first obtains transmit power information. Then, a transmitter 131 sends the transmit power information obtained by the processor 133 to the second device such that the second device obtains a distance between the second device and the first device 130. Compared with the other approaches in which a distance between devices is estimated only according to receive power, in this embodiment of the present disclosure, impact exerted on receive power by transmit power of the first device 130 is further considered. Therefore, in this embodiment of the present disclosure, the second device can obtain a more accurate distance between the second device and the first device 130.

Figure 14:
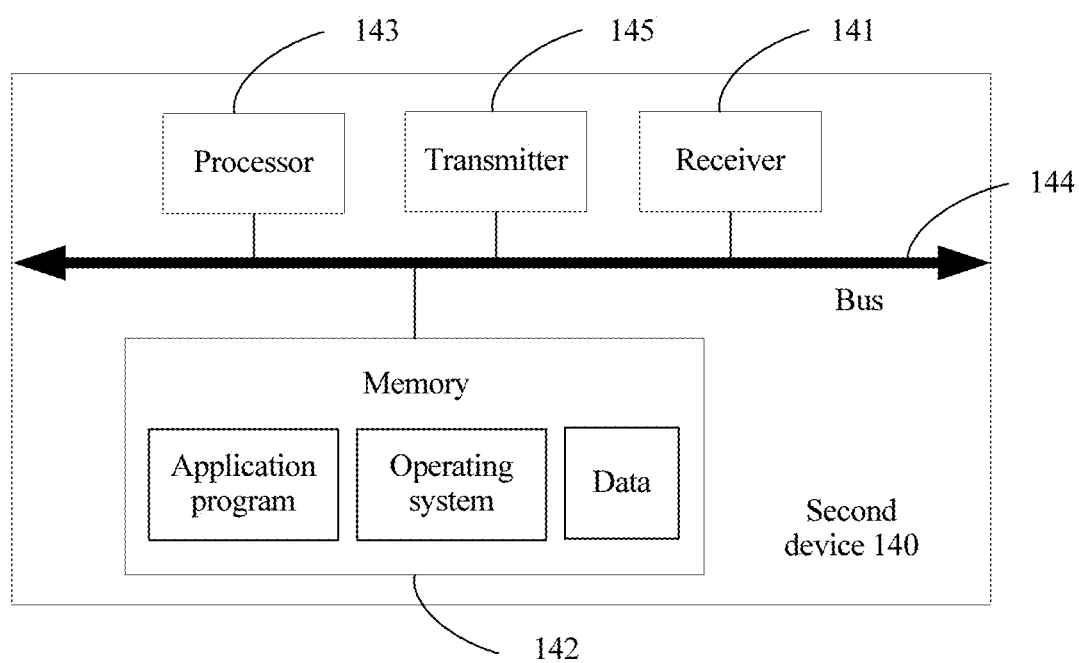
FIG. 14 is a schematic structural diagram of a second device according to still another embodiment of the present disclosure.

An embodiment of the present disclosure provides a second device that is configured to implement the foregoing D2D transmission distance obtaining method. As shown in FIG. 14, the second device 140 includes a receiver 141, a memory 142, a processor 143, and a bus 144. The receiver 141, the memory 142, and the processor 143 are connected using the bus 144 to implement mutual communication. The memory 142 is configured to store data processed by the processor 143.

The bus 144 may be an ISA bus, a PCI bus, an EISA bus, or the like. This is not limited herein. The bus 144 may be classified into an address bus, a data bus, a control bus, and the like. For convenience of denotation, the bus is represented using only one thick line in FIG. 14. However, it does not indicate that there is only one bus or only one type of bus.

The memory 142 is configured to store data or executable program code. The program code includes a computer operation instruction, and may be further an operating system, an application program, or the like. The memory 142 may include a high-speed RAM, or may further include a non-volatile memory, for example, at least one magnetic disk storage.

The processor 143 may be a CPU, or an ASIC, or one or more integrated circuits configured for implementing this embodiment of the present disclosure.

The processor 143 is configured to implement, by executing the program code in the memory 142, a method performed by a processing unit in the embodiment of the foregoing second device, and the receiver 141 is configured to perform a method performed by a receiving unit in the embodiment of the foregoing second device.

The receiver 141 is configured to receive transmit power information sent by the first device, and the transmit power information indicates transmit power used by the first device for sending data to the second device 140.

The processor 143 is configured to obtain receive power information, and the receive power information indicates receive power used by the second device 140 for receiving the data sent by the first device.

The processor 143 is further configured to obtain a distance between the second device 140 and the first device, and the distance between the second device 140 and the first device is obtained according to the receive power and the transmit power that is received by the receiver 141.

Optionally, the processor 143 is further configured to calculate the distance between the second device 140 and the first device according to the receive power and the transmit power.

As shown in FIG. 14, the second device further includes a transmitter 145 that is connected to the bus 144. The transmitter 145 is configured to perform a method performed by a sending unit in the embodiment of the foregoing second device.

The transmitter 145 is configured to send the transmit power information and the receive power information to a third device.

The processor 143 is further configured to obtain the distance between the second device 140 and the first device that is sent by the third device and received by the receiver 141.

Optionally, the receiver 141 is further configured to receive the transmit power information carried in the data.

Further optionally, the data is MAC layer communication data, and the transmit power information is included in a control unit of the MAC layer communication data.

Optionally, the receiver 141 is configured to obtain the transmit power information from physical layer control information of the data sent by the first device.

Optionally, the first device and the second device are terminals.

In the foregoing embodiment, a second device 140 receives transmit power information sent by the first device, and then obtains a distance between the second device 140 and the first device according to receive power and transmit power. Compared with the other approaches in which a distance between devices is estimated only according to receive power, in this embodiment of the present disclosure, impact exerted on the receive power by the transmit power of the first device is further considered. Therefore, in this embodiment of the present disclosure, the second device 140 can obtain a more accurate distance between the second device 140 and the first device.

Figure 15:
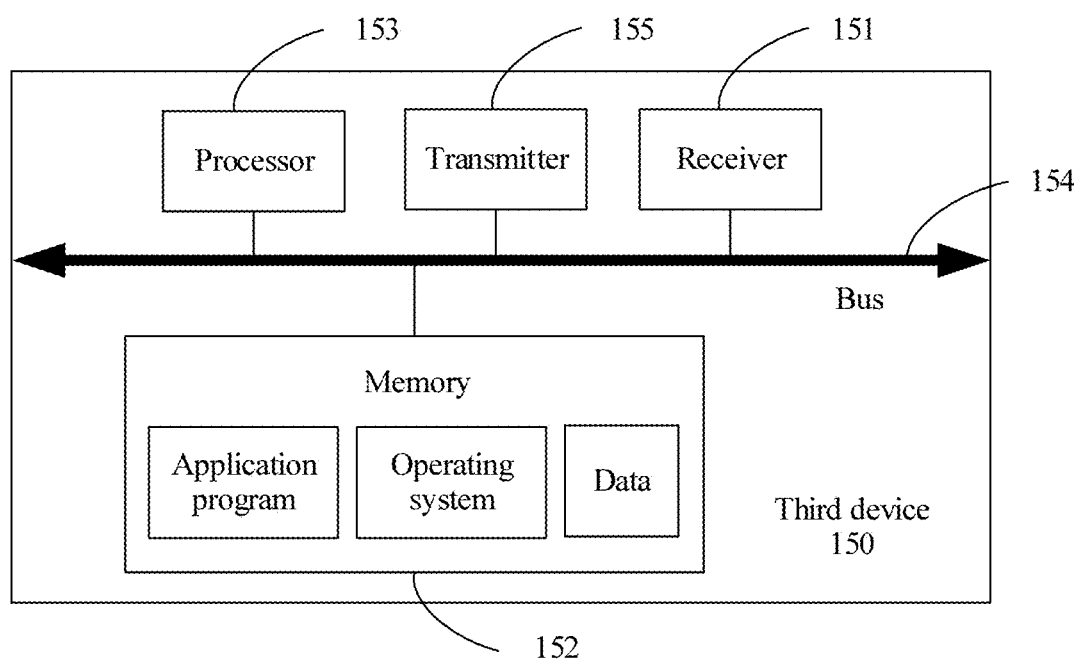
FIG. 15 is a schematic structural diagram of a third device according to another embodiment of the present disclosure.

An embodiment of the present disclosure provides a third device. As shown in FIG. 15, the third device 150 includes a receiver 151, a memory 152, a processor 153, a bus 154, and a transmitter 155. The receiver 151, the memory 152, the processor 153, and a transmitter 155 are connected using the bus 154 to implement mutual communication. The memory 152 is configured to store data processed by the processor 153.

The bus 154 may be an ISA bus, a PCI bus, an EISA bus, or the like. This is not limited herein. The bus 154 may be classified into an address bus, a data bus, a control bus, and the like. For convenience of denotation, the bus 154 is represented using only one thick line in FIG. 15. However, it does not indicate that there is only one bus or only one type of bus.

The memory 152 is configured to store data or executable program code. The program code includes a computer operation instruction, and may include an operating system, an application program, or the like. The memory 152 may include a high-speed RAM, or may further include a non-volatile memory, for example, at least one magnetic disk storage.

The processor 153 may be a CPU, or an ASIC, or one or more integrated circuits configured for implementing this embodiment of the present disclosure.

The processor 153 is configured to implement, by executing the program code in the memory 152, a method performed by a processing unit in the embodiment of the foregoing third device, the receiver 151 is configured to perform a method performed by a receiving unit in the embodiment of the foregoing third device, and the transmitter 155 is configured to perform a method performed by a sending unit in the embodiment of the foregoing third device.

The receiver 151 is configured to receive transmit power information and receive power information that are sent by the second device. The transmit power information indicates a transmit power used by a first device for sending data to the second device, and the receive power information indicates a receive power used by the second device for receiving the data sent by the first device.

The processor 153 is configured to calculate a distance between the second device and the first device according to the transmit power and the receive power that are received by the receiver 151.

The transmitter 155 is configured to send, to the second device, the distance between the second device and the first device that is obtained by the processor 153.

Optionally, the first device and the second device are terminals, and the third device 150 is a base station or a core network element.

Further optionally, the core network element is a ProSe Function entity.

In the foregoing embodiment, a third device 150 receives transmit power information and receive power information that are sent by the second device, then obtains a distance between the second device and the first device according to receive power and transmit power, and sends the distance between the second device and the first device to the second device. Compared with the other approaches in which a distance between devices is estimated only according to receive power, in this embodiment of the present disclosure, impact exerted on the receive power by the transmit power of the first device is further considered. Therefore, in this embodiment of the present disclosure, the second device can obtain a more accurate distance between the second device and the first device.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A device-to-device (D2D) transmission distance obtaining method, comprising:
   receiving, by a second device from a first device, transmit power information that indicates a transmit power at which the first device sends data to the second device, wherein the transmit power information is included in a header of Media Access Control (MAC) layer communication data from the first device, and wherein the transmit power is represented as a distance value or a distance threshold range;
   obtaining, by the second device, receive power information that indicates a receive power at which the second device receives the data from the first device; and
   obtaining, by the second device, a distance between the second device and the first device according to the receive power and the transmit power, wherein the distance between the second device and the first device is calculated by:
   subtracting the receive power from the transmit power to obtain a power difference; and
   dividing the power difference by a power loss per unit of distance to calculate the distance.

2. The method of claim 1, further comprising obtaining, by the second device, the transmit power information from a physical layer synchronization channel.

3. The method of claim 1, further comprising sending, by the second device, the transmit power information and the receive power information to a third device, and wherein obtaining the distance between the second device and the first device comprises receiving, by the second device, the distance between the second device and the first device from the third device.

4. The method of claim 3, wherein the third device comprises a base station configured to communicate with the first device and the second device.

5. The method of claim 3, wherein the third device comprises a core network element.

6. The method of claim 5, wherein the core network element comprises a proximity-based service function entity.

7. The method of claim 3, wherein the first device and the second device comprise wireless terminals, and wherein the third device comprises a base station or a core network element.

8. The method of claim 1, wherein the transmit power is further represented as a destination distance for which the data is transmitted.

9. The method of claim 1, wherein the transmit power is represented as the distance threshold range, and wherein the distance threshold range comprises one of a long distance, a middle distance, or a short distance.

10. A device-to-device (D2D) transmission distance obtaining method, comprising:
- receiving, by a third device from a second device, transmit power information and receive power information, wherein at least one of the transmit power information or the receive power information is included in a header of Media Access Control (MAC) layer communication data, wherein the transmit power information indicates a transmit power at which a first device sent data to the second device, wherein the receive power information indicates a receive power at which the second device received the data, and wherein the transmit power is represented as a distance value or a distance threshold range;
- calculating, by the third device, a distance between the second device and the first device according to the transmit power and the receive power; and
- sending, by the third device to the second device, the distance between the second device and the first device,
- wherein calculating the distance between the second device and the first device comprises:
  - obtaining a power difference by subtracting the receive power from the transmit power; and
  - calculating the distance by dividing the power difference by a power loss per unit of distance.

11. The method of claim 10, wherein the first device and the second device are wireless terminals, and wherein the third device is a base station.

12. The method of claim 10, wherein the first device and the second device are wireless terminals, and wherein the third device is a core network element.

13. The method of claim 12, wherein the core network element is a proximity-based service (Pro-Se) function entity.

14. The method of claim 10, wherein the transmission power information is represented as the distance threshold range, and wherein the distance threshold range includes one of a long distance, a middle distance, or a short distance.

15. The method of claim 10, wherein the transmission power information is further represented as a destination distance for which the data is transmitted.

16. The method of claim 10, wherein the third device sends transmission power information is included in the header of a data packet that includes the data.

17. An apparatus in a device-to-device (D2D) wireless system, comprising:
- a memory device storing instructions; and
- a processor coupled to the memory device and configured to execute the instructions to cause the apparatus to:
- receive, from a first device, transmit power information and receive power information, wherein the transmit power information indicates a transmit power at which a second device sent data to the first device, wherein the receive power information indicates a receive power at which the first device received the data, and wherein the transmit power is represented as a distance value or a distance threshold range;
- subtract the receive power from the transmit power to obtain a power difference;
- divide the power difference by a power loss per unit to calculate a distance between the first device and the second device; and
- send the distance between the first and second devices to the second device.

* * * * *